United States Patent [19]
Lamm et al.

[11] Patent Number: 5,059,684
[45] Date of Patent: Oct. 22, 1991

[54] AZO DYES WHOSE DIAZO AND COUPLING COMPONENTS STEM FROM THE THIAZOLE SERIES

[75] Inventors: Gunther Lamm, Hassloch; Karl H. Etzbach, Frankenthal; Matthias Wiesenfeldt, Mutterstadt; Guenter Hansen, Ludwigshafen; Helmut Reichelt, Neustadt, all of Fed. Rep. of Germany

[73] Assignee: BASF Aktiengesellschaft, Ludwigshafen, Fed. Rep. of Germany

[21] Appl. No.: 489,327

[22] Filed: Mar. 5, 1990

[30] Foreign Application Priority Data

Mar. 31, 1989 [DE] Fed. Rep. of Germany ....... 3910408

[51] Int. Cl.$^5$ .................... C09B 29/042; C09B 29/36; D06P 1/18; D06P 3/36
[52] U.S. Cl. .................... 534/765; 534/581; 548/200; 548/203
[58] Field of Search ........................................ 534/765

[56] References Cited

U.S. PATENT DOCUMENTS 3,770,719 11/1973 Fisher et al. ............... 534/765 X
4,340,537 7/1982 Eilingsfeld et al. ............... 534/775
4,505,857 3/1985 Egli et al. ...................... 534/765 X

FOREIGN PATENT DOCUMENTS 335234 10/1989 European Pat. Off. ............ 534/765
2738885 3/1979 Fed. Rep. of Germany ...... 534/765

OTHER PUBLICATIONS

The Chemistry of Heterocyclic Compounds–Thiazole and its Derivatives, vol. 34, Part I, Interscience Publication, New York, 1979, J. V. Metzger.

Surnitomo, *Chemical Abstracts*, vol. 98, No. 73836k (1983).

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Thiazole-azo dyes of the formula

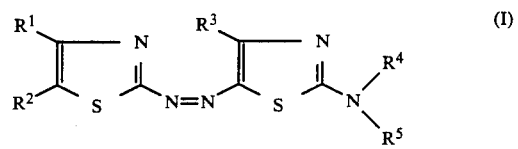

where
$R^1$ is $C_1$-$C_{12}$-alkyl, which may be interrupted by oxygen atoms, phenyl, halogen, cyano or $C_1$-$C_4$-alkoxycarbonyl,
$R^2$ is formyl, cyano, $C_1$-$C_4$-alkoxycarbonyl or a radical of the formula —CH=$CX^1X^2$, where $X^1$ and $X^2$ independently of each other are cyano or $C_1$-$C_4$-alkoxycarbonyl,
$R^3$ is $C_1$-$C_{12}$-alkyl, which may be interrupted by oxygen atoms or substituted by phenyl or phenoxy, $C_5$-$C_7$-cycloalkyl, substituted or unsubstituted phenyl, furyl, thienyl, $C_1$-$C_4$-alkylthienyl or pyridyl, and
$R^4$ and $R^5$ independently of each other are $C_1$-$C_{12}$-alkyl, which may be interrupted by oxygen atoms and/or substituted, with the proviso that in at least one of $R^1$, $R^4$ and $R^5$ the alkyl chain is interrupted by oxygen atoms, are useful for dyeing textile fibers.

2 Claims, No Drawings

AZO DYES WHOSE DIAZO AND COUPLING COMPONENTS STEM FROM THE THIAZOLE SERIES

The present invention relates to novel thiazole-azo dyes of the formula I

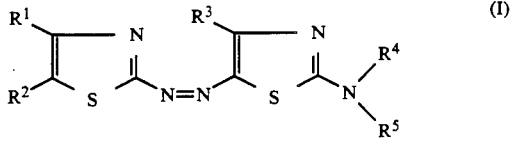

where
- $R^1$ is $C_1$–$C_{12}$-alkyl, which may be interrupted by from 1 to 3 oxygen atoms, phenyl, halogen, cyano or $C_1$–$C_4$-alkoxycarbonyl,
- $R^2$ is formyl, cyano, $C_1$–$C_4$-alkoxycarbonyl or a radical of the formula —CH=CX$^1$X$^2$, where $X^1$ and $X^2$ are identical or different and each is independently of the other cyano or $C_1$–$C_4$-alkoxycarbonyl,
- $R^3$ is $C_1$–$C_{12}$-alkyl, which may be interrupted by from 1 to 4 oxygen atoms or substituted by phenyl or phenoxy, $C_5$–$C_7$-cycloalkyl, substituted or unsubstituted phenyl, furyl, thienyl, $C_1$–$C_4$-alkylthienyl or pyridyl, and
- $R^4$ and $R^5$ are identical or different and each is independently of the other $C_1$–$C_{12}$-alkyl, which may be interrupted by from 1 to 3 oxygen atoms and/or substituted by hydroxyl or phenyl, with the proviso that in at least one of $R^1$, $R^4$ and $R^5$ the alkyl chain is interrupted by from 1 to 3 oxygen atoms, and to the use thereof for dyeing textile fibers.

DE-A-3 108 077 describes the dye 2-diethylamino-4-phenyl-5-(4′-chloro-5′-formylthiazol-2′-ylazo)thiazole.

DE-A-2 910 806 and JP-A-151 653/1982 disclose azo dyes where the coupling component is a thiazole derivative. Earlier patent applications EP-A-335 234 and DE-A-3 816 698 also disclose thiazole-azo dyes having a diazo component of the isothiazole series.

It is an object of the present invention to provide new azo dyes having a diazo component and a coupling component of the thiazole series which have an advantageous range of application properties.

We have found that this object is achieved by the above-defined thiazole-azo dyes of the formula I.

Any alkyl appearing in the abovementioned formula I may be either straight-chain or branched.

If substituted phenyl appears in the above-mentioned formula I, suitable substituents are for example $C_1$–$C_4$-alkyl, $C_1$–$C_4$-alkoxy, halogen, in particular chlorine or bromine, $C_1$–$C_4$-alkanoylamino and nitro.

Suitable, $R^1$, $R^2$, $X^1$ and $X^2$ are each for example methoxycarbonyl, ethoxycarbonyl, propoxycarbonyl, isopropoxycarbonyl, butoxycarbonyl or sec-butoxycarbonyl.

$R^2$ is also for example CH=C(CN)$_2$ CH=C(CN)COOCH$_3$, CH=C(CN)COOC$_2$H$_5$, CH=C(COOCH$_3$)$_2$ or CH=C(COOC$_2$H$_5$)$_2$.

$R^1$ is further for example, like $R^3$, $R^4$ and $R^5$, methyl, ethyl, propyl, isopropyl, butyl, isobutyl, secbutyl, pentyl, isopentyl, neopentyl, tert-pentyl, hexyl, heptyl, oxtyl, 2-ethylhexyl, isooctyl, nonyl, isononyl, decyl, isodecyl, undecyl or dodecyl. (Isooctyl, isononyl and isodecyl are trivial names derived from the oxo synthesis alcohols - cf. Ullmanns Enzyklopädie der technischen Chemi, 4th edition, volume 7, pages 215 to 217, and volume 11, pages 435 and 436.)

$R^1$ is further for example chlorine or bromine.

$R^3$ is further for example cyclopentyl, cyclohexyl, cycloheptyl, 2-, 3- or 4-methylcyclohexyl, 2-, 3- or 4-methylphenyl, 2-, 3- or 4-methoxyphenyl, 2-, 3- or 4-chlorophenyl, 2,4-dichlorophenyl, 2-, 3- or 4-bromophenyl, 2-, 3-or 4-formylaminophenyl, 2-, 3- or 4-acetylaminophenyl, 2-, 3- or 4-nitrophenyl or 5-methylthien-2-yl.

$R^1$, $R^3$, $R^4$ and $R^5$ are each further for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl or 3,6,9-trioxaundecyl.

$R^3$, $R^4$ and $R^5$ are each further for example benzyl or 1- or 2-phenylethyl.

$R^4$ and $R^5$ are each further for example 2-hydroxyethyl, 2- or 3-hydroxypropyl or 2- or 4-hydroxybutyl.

$R^3$ is further for example 2-phenoxybutyl, 3,6,9,12-tetraoxatridecyl or 3,6,9,12-tetraoxatetradecyl.

Preference is given to thiazole-azo dyes of the formula I where $R^4$ and $R^5$ are each independently of each other $C_1$–$C_6$ alkyl which may be interrupted by 1 or 2 oxygen atoms.

Particular preference is given to those thiazoleazo dyes of the formula I where $R^4$ is different than $R^5$.

The thiazole-azo dyes according to the present invention are prepared in a conventional manner. For example, a 2-aminothiazole of the formula II

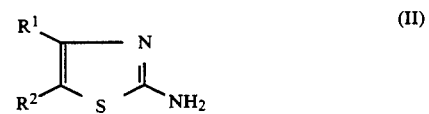

where $R^1$ and $R^2$ are each as defined above, can be diazotized and coupled with a thiazole of the formula III

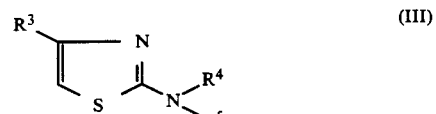

where $R^4$, $R^4$ and $R^5$ are each as defined above.

2-Aminothiazoles of the formula II are already known and described for example in US-A-4 395 544, or can be obtained in a similar manner to that described therein.

The thiazoles of the formula III are in general likewise known compounds. They are described for example in US-A-3 770 719 and in J.V. Metzger, Heterocyclic Compounds - Thiazole and its Derivatives, vol. 34, part 1, Interscience Publ., John Wiley, New York, 1979, or can be obtained by methods similar to those described therein.

Further details of the preparation of the dyes according to the present invention may be found in the Examples.

In general, those thiazole-azo dyes of the formula I where $R^4$ and $R^5$ together have four or more oxygen atoms are liquid at room temperature.

The novel thiazole-azo dyes of the formula I are advantageously used as disperse dyes for dyeing textile fibers, in particular cellulose esters or polyesters, and also polyamides or blends of polyesters and cellulose fibers.

The dyeings obtained have good fastness properties, in particular good light fastness. The novel dyes have good migration properties.

The Examples which follow further illustrate the invention.

EXAMPLE 1

16.25 g of 2-amino-4-chloro-5-formylthiazole were sprinkled into a mixture of 110 g of 90% strength by weight sulfuric acid, 17 g of glacial acetic acid and 32 g of 45% strength by weight nitrosyl sulfuric acid at 0°–3° C. The resulting solution was stirred at from −2° to 0° C. for 3.5 hours. The diazonium salt solution was then added to a 0° C. solution of 24 g of the coupling component of the formula

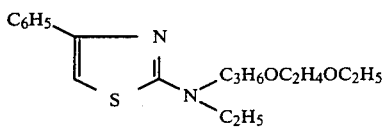

in 200 ml of glacial acetic acid, 50 ml of propionic acid and 1 g of urea. During the addition of the diazonium salt solution, 70 g of sodium acetate were added at the same time while the temperature was maintained at <5° C. The coupling reaction, which proceeds even in strongly acidic solution, was complete within a few minutes. The resulting dye of the formula

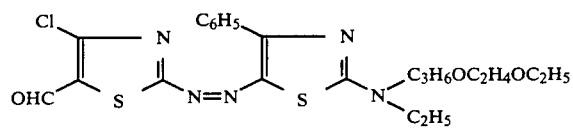

was filtered off with suction, washed and dried. 35 g were obtained of a bluish black, resinous dye which gives a reddish blue solution in N,N-dimethylformamide and dyes polyester fabric in bright reddish blue or navy shades. The absorption maximum of the dye, dissolved in 9:1 v/v N,N-dimethylformamide/glacial acetic acid, is 582 nm. The dyeings on polyester fabric are notable for very good light fastness, even in pale shades.

EXAMPLE 2

16.25 g of 2-amino-4-chloro-5-formylthiazole were diazotized as described in Example 1 and reacted with 24 g of the coupling component of the formula

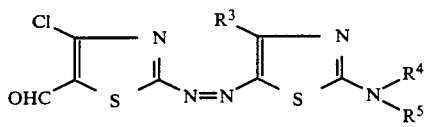

31 g were obtained of a bluish green dye (absorption maximum 609 nm), which dyes polyester fabric in very light-fast greenish blue shades. The dye has the formula

EXAMPLE 3

Example 1 was repeated, except that the coupling component used was the furan derivative of the formula affording the greenish blue dye of the formula $\lambda_{max}$: 606 nm.

The same method was used to obtain the dyes of the formula listed in the following Table:

| Example No. | $R^3$ | $R^4$ | $R^5$ | Hue |
|---|---|---|---|---|
| 4 | $C_6H_5$ | $C_2H_5$ | $C_3H_6OCH_3$ | reddish blue |
| 5 | $C_6H_5$ | $C_2H_5$ | $C_3H_6OC_2H_5$ | reddish blue |
| 6 | $C_6H_5$ | $C_2H_5$ | $C_3H_6OC_2H_4OCH_3$ | reddish blue |
| 7 | $C_6H_5$ | $C_3H_7(n)$ | $C_3H_6OC_2H_4OCH_3$ | reddish blue |
| 8 | $C_6H_5$ | $C_3H_7(n)$ | $C_3H_6OC_2H_4OC_2H_5$ | reddish blue |
| 9 | $C_6H_5$ | $C_3H_7(n)$ | $C_3H_6OCH_3$ | reddish blue |
| 10 | $C_6H_5$ | $C_3H_7(i)$ | $C_3H_6OCH_3$ | reddish blue |

-continued

| Example No. | R³ | R⁴ | R⁵ | Hue |
|---|---|---|---|---|
| 11 | C₆H₅ | C₃H₇(i) | C₃H₆OC₂H₄OCH₃ | reddish blue |
| 12 | C₆H₅ | C₂H₅ | C₂H₄OC₂H₄OC₂H₅ | reddish blue |
| 13 | C₆H₅ | C₂H₅ | C₂H₄OCH₃ | reddish blue |
| 14 | C₆H₅ | C₃H₆OCH₃ | C₃H₆OCH₃ | reddish blue |
| 15 | C₆H₅ | C₃H₆OCH₃ | C₃H₆OC₂H₅ | reddish blue |
| 16 | 4-Cl-C₆H₄- | C₂H₅ | C₃H₆OCH₃ | reddish blue |
| 17 | 4-CH₃O-C₆H₄- | C₂H₅ | C₃H₆OC₂H₅ | blue |
| 18 | 3-(CH₃COHN)-C₆H₄- | C₂H₅ | C₃H₆OC₂H₅ | blue |
| 19 | 2-thienyl | C₂H₅ | C₃H₆OC₂H₅ | bluish green |
| 20 | 2-thienyl | C₂H₅ | C₃H₆OCH₃ | bluish green |
| 21 | 2-thienyl | C₂H₅ | C₂H₄OC₂H₅ | bluish green |
| 22 | 2-thienyl | C₃H₇(n) | C₃H₆OCH₃ | bluish green |
| 23 | 2-thienyl | C₃H₇(n) | C₃H₆OC₂H₄OCH₃ | bluish green |
| 24 | 2-thienyl | C₃H₇(i) | C₃H₆OC₂H₄OCH₃ | bluish green |
| 25 | 2-thienyl | C₂H₅ | C₃H₆OC₂H₅ | bluish green |
| 26 | 3-thienyl | C₂H₅ | C₃H₆OCH₃ | reddish blue |
| 27 | 3-thienyl | C₂H₅ | C₃H₆OC₂H₅ | reddish blue |
| 28 | 3-thienyl | C₃H₇(i) | C₃H₆OCH₃ | reddish blue |

-continued

| Example No. | R³ | R⁴ | R⁵ | Hue |
|---|---|---|---|---|
| 29 | thiophene | C₃H₇(n) | C₃H₆OCH₃ | reddish blue |
| 30 | thiophene | C₃H₇(n) | C₂H₄OCH₃ | reddish blue |
| 31 | thiophene | C₂H₅ | C₃H₆OC₂H₄OCH₃ | reddish blue |
| 32 | thiophene | C₂H₅ | C₃H₆OC₂H₄OC₂H₅ | reddish blue |
| 33 | 2,5-dimethylthiophene | C₂H₅ | C₃H₆OC₂H₄OC₂H₅ | bluish green |
| 34 | 2,5-dimethylthiophene | C₂H₅ | C₃H₆OC₂H₄OCH₃ | bluish green |
| 35 | 2,5-dimethylthiophene | C₂H₅ | C₃H₆OC₂H₅ | bluish green |
| 36 | 2,5-dimethylthiophene | C₂H₅ | C₃H₆OCH₃ | bluish green |
| 37 | 2,5-dimethylthiophene | C₃H₇(n) | C₃H₆OCH₃ | bluish green |
| 38 | 2,5-dimethylthiophene | C₃H₆OCH₃ | C₃H₆OCH₃ | bluish green |
| 39 | pyridine | C₃H₆OCH₃ | C₂H₅ | reddish blue |
| 40 | cyclohexyl | C₂H₄OCH₃ | C₂H₄OCH₃ | dull bluish red |
| 41 | cyclohexyl | C₂H₅ | C₂H₄OCH₃ | dull bluish red |
| 42 | cyclohexyl | C₂H₅ | C₃H₆OCH₃ | dull bluish red |

-continued

| Example No. | R³ | R⁴ | R⁵ | Hue |
|---|---|---|---|---|
| 43 | cyclohexyl-H | C₂H₅ | C₃H₆OC₂H₅ | dull bluish red |
| 44 | cyclohexyl-H | C₂H₅ | C₃H₆OC₂H₄OCH₃ | dull bluish red |
| 45 | cyclohexyl-H | C₂H₅ | C₃H₆OC₂H₄OC₂H₅ | dull bluish red |
| 46 | cyclohexyl-H | C₃H₇(n) | C₃H₆OC₂H₄OC₂H₅ | dull bluish red |
| 47 | CH₃-cyclohexyl-H | C₂H₅ | C₃H₆OCH₃ | dull bluish red |
| 48 | C₆H₅OCH₂ | C₂H₅ | C₃H₆OCH₃ | dull bluish red |
| 49 | C₆H₅OCH₂ | C₂H₅ | C₃H₆OC₂H₄OCH₃ | dull bluish red |
| 50 | C₆H₅OCH(CH₃) | C₂H₅ | C₃H₆OC₂H₄OCH₃ | dull bluish red |
| 51 | C₆H₅CH₂ | C₂H₅ | C₃H₆OC₂H₄OCH₃ | dull bluish red |
| 52 | C₆H₅CH₂ | C₂H₅ | C₃H₆OCH₃ | dull bluish red |
| 53 | C₆H₅CH₂ | C₂H₅ | C₃H₆OC₂H₄OCH₃ | dull bluish red |
| 54 | C₆H₅ | C₂H₄OCH₃ | CH₂CH₂C₆H₅ | blue |

We claim:
1. A thiazole-azo dye of the formula I

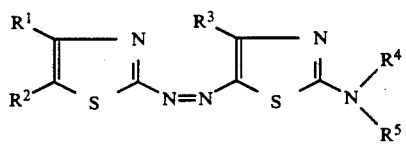

where
$R^1$ is $C_1$–$C_{12}$-alkyl, which may be interrupted by from 1 to 3 oxygen atoms, phenyl, halogen, cyano or $C_1$–$C_4$-alkoxycarbonyl, $R^2$ is formyl, cyano, $C_1$–$C_4$-alkoxycarbonyl or a radical of the formula $-CH=CX^1X^2$, where $X^1$ and $X^2$ are identical or different and each is independently of the other cyano or $C_1$–$C_4$-alkoxycarbonyl, $R^3$ is $C_1$–$C_{12}$-alkyl, which may be interrupted by from 1 to 4 oxygen atoms or substituted by phenyl or phenoxy, $C_5$–$C_7$-cycloalkyl, unsubstituted phenyl, furyl, thienyl, $C_1$–$C_4$-alkylthienyl or pyridyl, and $R^4$ and $R^5$ are identical or different and each is independently of the other $C_1$–$C_{12}$-alkyl, which may be interrupted by from 1 to 3 oxygen atoms and substituted by hydroxyl or phenyl or substituted by hydroxyl or phenyl with the proviso that in at least one of $R^1R^4$ and $R^5$ the alkyl chain is interrupted by from 1 to 3 oxygen atoms.

2. A thiazole-azo dye as claimed in claim 1, wherein $R^4$ and $R^5$ are each independently of the other $C_1$–$C_6$-alkyl which may be interrupted by 1 or 2 oxygen atoms.

* * * * *